Figure 1A:
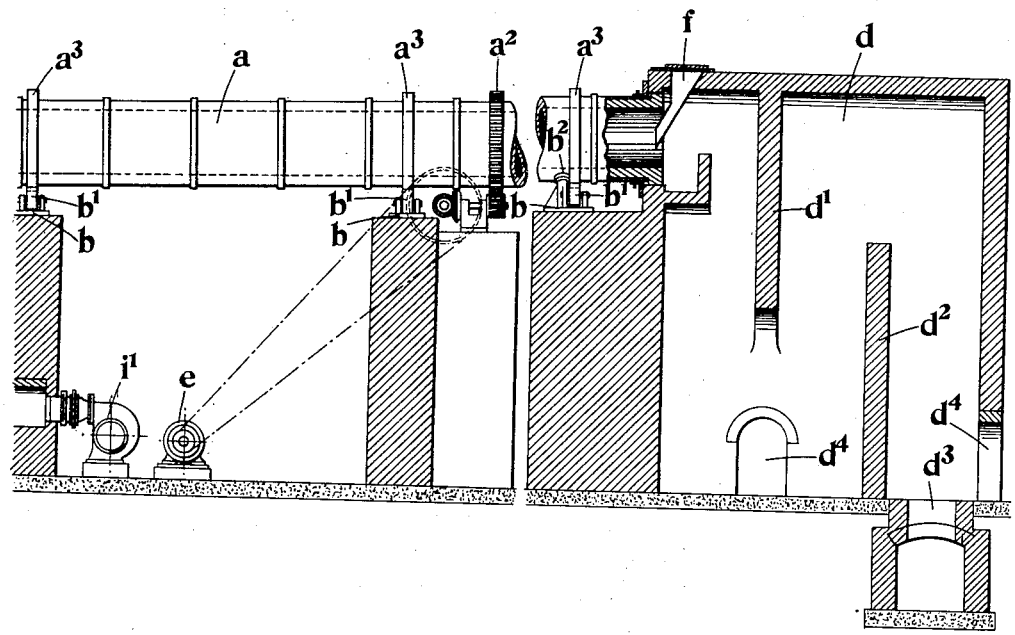

E. R. SUTCLIFFE.
METHOD FOR TREATING BURNT PYRITES AND THE LIKE.
APPLICATION FILED JULY 11, 1913.
1,245,634.
Patented Nov. 6, 1917.
3 SHEETS—SHEET 1.
Fig.1.
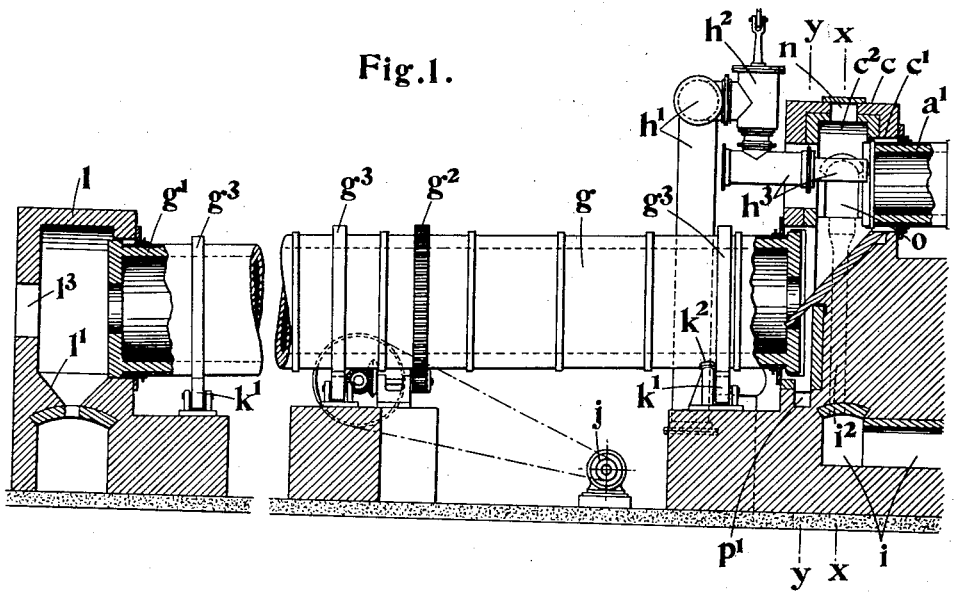
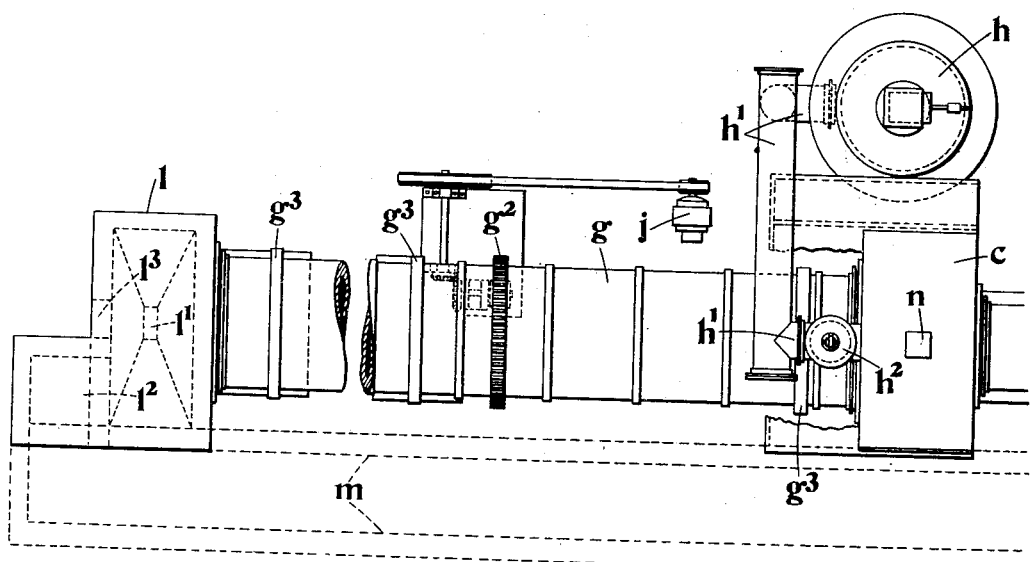
Fig.2.
Witnesses—
Stanley Wood
Robert Owen Hughes
Inventor
Edgar Rouse Sutcliffe.
by
Attorney.

UNITED STATES PATENT OFFICE.

EDGAR ROUSE SUTCLIFFE, OF LEIGH, ENGLAND.

METHOD FOR TREATING BURNT PYRITES AND THE LIKE.

1,245,634.  Specification of Letters Patent.  Patented Nov. 6, 1917.

Application filed July 11, 1913. Serial No. 778,554.

*To all whom it may concern:*

Be it known that I, EDGAR ROUSE SUT-CLIFFE, a subject of the King of Great Britain and Ireland, residing at Leigh, Lancashire, England, have invented a Method for Treating Burnt Pyrites and the like, of which the following is a specification.

This invention relates to a method for treating ores or residues and is of especial application in the roasting of spent pyrites and the like in which spent pyrites is roasted with common salt for the conversion of the copper contained therein into cupric chlorid for the subsequent extraction of the metal by the wet method.

The roasting of spent or burnt pyrites has been effected in so-called hand-furnaces, which involve considerable labor to work owing to the attention necessary for the effective treatment of the raw material, so that the costs of working both in respect to labor and fuel were considerable and rendered the process expensive.

The present invention has for its object to effect economically the roasting of burnt or spent pyrites or certain other kinds of copper ores, particularly those ores containing a high content of silica, and according to the invention this is effected by subjecting the mixture of pyrites and salt in a rotary furnace to the temperature necessary for the reaction to be effected by which the metal contained in the pyrites is converted into chlorid of copper and then allowing this temperature to be maintained for a considerable time while the charge is agitated in another rotary furnace to which it is transferred, the charge at the same time moving slowly toward the end of the furnace, by which time the reaction will have been completed and practically the whole of the metal converted into chlorid.

The construction of apparatus which it is preferred to employ is illustrated in the accompanying drawings, in which:—

Figure 2A:
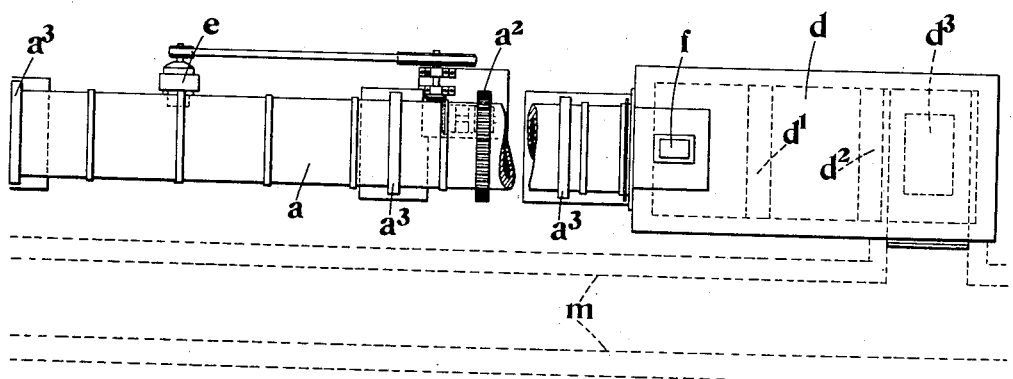
Figure 3:
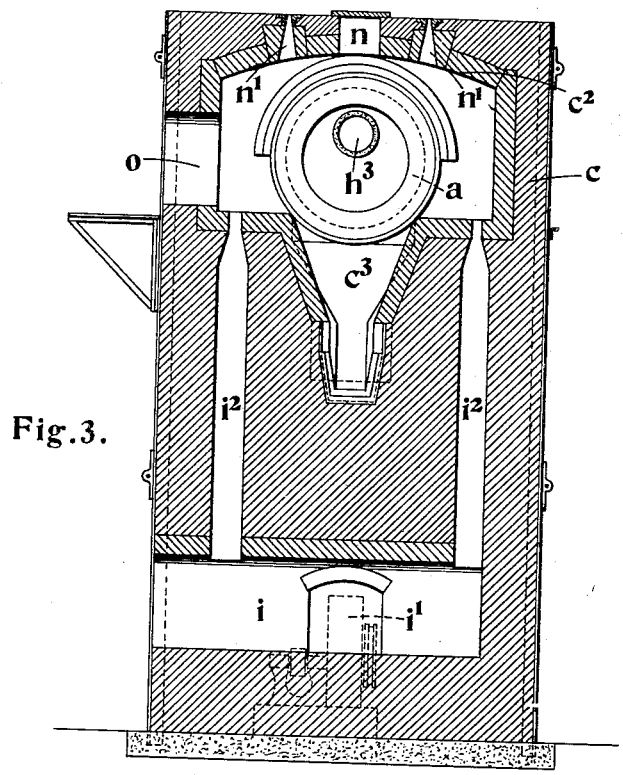
Figure 4:
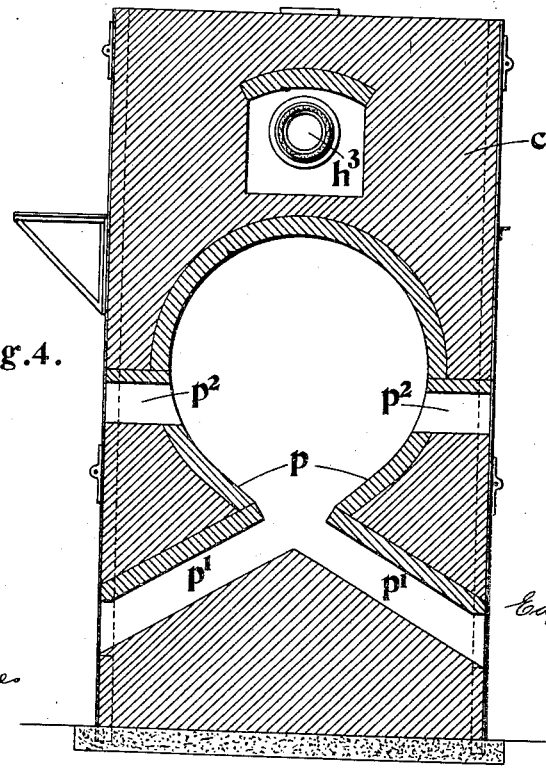

Figures 1 and 1ª are an elevation of the complete apparatus, partly in section,

Figs. 2 and 2ª are a plan view, corresponding to Fig. 1,

Fig. 3 is a cross-section taken on the line $x\ x$ of Fig. 1, to an enlarged scale, and Fig. 4 is a cross-section taken on the line $y\ y$ of Fig. 1, to an enlarged scale.

In carrying the invention into effect in the apparatus illustrated in the drawings, I provide the first or heating furnace as a cylinder $a$ of metal provided with refractory brickwork or other suitable lining $a^1$ and provided advantageously in a middle position with a toothed ring $a^2$ or other means by which a relatively slow movement of rotation may be imparted to it. At suitable positions in the length of this furnace I provide circular rims or flanges $a^3$, in a position intermediate of the combustion chamber $c$ and a discharging chamber or outlet chamber for the combustion products $d$ for the support of the rotary furnace and by which it may rotate upon rollers $b^1$ suitably mounted for the purpose upon pedestals $b$ which also serve to carry thrust rollers $b^2$ adapted to bear laterally upon the rims or flanges $a^3$ to prevent longitudinal movement of the cylinder $a$ when rotating.

I advantageously provide a separate electro-motor $e$ by means of which the first rotary furnace or cylinder $a$ may be rotated at a determined speed, for example 5 revs. per minute, a suitable reducing gear being interposed for the purpose, such as a combination spur and bevel gear or spur and worm gear.

The material, consisting of spent or burnt pyrites and salt in a fine or comminuted condition, is introduced into the first rotary furnace or cylinder $a$ through a chute $f$ mounted in a suitable position above the discharging chamber $d$, the rotary furnace being maintained at such an inclination as, at the relatively slow speed of rotation imparted to it, will insure that the mixed mass is fed forward at such a speed as will allow of the mass being heated to from 600 to 700 deg. C. or as required.

The time needed for the charge to travel through the first rotary furnace or cylinder requires to be varied according to the kind of ore treated and the heat required for such ore, and in general varies from 30 to 40 minutes.

The end of the first rotary furnace opposite to that in which the material is introduced is mounted within a circular aperture $c^1$ of the combustion chamber $c$.

The combustion chamber is advantageously provided with a semi-circular arch $c^2$, and at the bottom and immediately beneath the end of the rotary furnace an inclined wall $c^3$ is formed centrally of the furnace, down which the discharged mass may pass into the mouth of the second rotary furnace or cylinder $g$ which is disposed at a lower level and has its mouth mounted in the combustion chamber setting in an opposite position but beneath the combustion chamber and communicating with it by the space formed by means of the inclined wall $c^3$ aforesaid.

I advantageously provide a gas producer $h$ for the supply of gas for the furnace, and I advantageously admit the gas into the combustion chamber by means of a supply conduit $h^1$ provided with a regulating valve $h^2$ and a nozzle or similar fitting $h^3$ serving to deliver the gas at the mouth of the furnace $a$. In the combustion chamber setting and in a position beneath the level of the second rotary furnace $g$ I provide a transverse flue $i$, into which air is supplied from a fan $i^1$, and from this transverse flue air passes through two vertical flues $i^2$ one on each side of the setting, so that their upper ends are adjacent the gas inlet and provided on each side of the combustion chamber.

The second rotary furnace or cylinder $g$ is advantageously provided of a diameter larger than the first and is also lined with refractory brickwork or other suitable material $g^1$ which preferably is flanged inwardly at the ends to reduce the diameter of the inlet and outlet. The furnace $g$ also has midway along its length a toothed ring $g^2$ by means of which it may be rotated by a separate electromotor $j$ through suitable gearing at a determined speed, which may be slower than that of the first rotary furnace. Rims or flanges $g^3$ are also provided by means of which it may be supported to rotate upon rollers $k^1$ and against thrust rollers $k^2$ suitably mounted for the purpose after the manner of the rollers $b^1$, $b^2$.

The inclination of the second rotary furnace $g$ is advantageously less than that of the first rotary furnace $a$. It will, however, be understood that the relative speeds of rotation and inclination, as well as the dimensions of the rotary furnaces employed, may be varied within wide limits, the purpose being that in the first rotary furnace the material is heated to the necessary temperature for the reaction to take place and that in the second the mass is continuously agitated while it is maintained at a sufficiently high temperature for the complete conversion of the metal.

The time allowed for the passage of the charge through the second rotary furnace or cylinder is varied from 3 to 8 hours according to the kind of ore treated and the copper contents.

The end of the second rotary furnace opposite to that in which the heated mass is introduced is mounted within a brickwork setting $l$ comprising a chute $l^1$ through which the material may be discharged, while an outlet $l^2$, as well as a manhole $l^3$, is provided in the setting for the exit of the gases into a discharge flue $m$ running the length of the apparatus, which flue serves also to receive the gases discharged from the chamber $d$. The discharging chamber $d$ is provided with partition walls $d^1$ $d^2$ extending partly across the interior and serving to cause the gases to take a tortuous course before passing out by way of the outlet $d^3$ to the flue $m$. Suitable man-holes $d^4$ are also provided in this chamber.

In operation it will be understood that the gases from the combustion chamber pass up the first rotary furnace $a$ and discharge into the discharging chamber $d$, in which the dust settles before the gases pass out. Part of the gases from the combustion chamber may also pass through the second, or lower, rotary furnace $g$, but generally the heat of the charge on entry and the heat generated by the reaction which is continued in the furnace $g$ is sufficient. If desired, however, air may be allowed to enter and will give heat by the combustion of the gases generated.

The combustion chamber $c$ may conveniently be provided in the upper arch with sight apertures $n^1$ and an inspection opening $n$ while laterally there may be provided a manhole $o$ leading from a suitable gallery or like structure.

The aperture in the setting within which the mouth of the furnace $g$ is received may have the lower portion formed by inclined walls $p$ leading to inclined passages $p^1$ extending to the outer walls of the setting. Lateral passages $p^2$ may also be provided.

It may be desirable in some cases to provide the second rotary furnace $g$ with brickwork ridges or narrow partition walls at intervals along the length of the interior in order to assist in the agitation of the material passing through the furnace.

It will, however, be understood that the invention is not confined to the actual construction which is hereinbefore described, as the method of the invention may be carried into effect by a different arrangement of the combustion chamber and rotary furnaces without departing from its essential features.

What I claim as my invention and desire to secure by Letters Patent is:—

A method of chloridizing ores or residues such as spent or burnt pyrites, consisting in subjecting the ore or residue with common salt continuously to extraneous heat for a short time (for example from 30 to 40 minutes) within a furnace in which the charge during treatment is moved from the inlet to the outlet of the furnace, by which the greater part of the metal to be recovered is converted into chlorid and remains in that condition in the ore or residue, and after this operation has been completed transferring the ore or residue to a second furnace, of greater capacity than the first, in which the same reaction is continued but for a very considerable time (for example from 3 to 8 hours) and in which the ore or residue is maintained at the necessary temperature while it is agitated and moved slowly toward the outlet of the furnace, so that the reaction may be completed in its course from the inlet to the outlet and the small residual proportion of metal, unconverted within the first furnace, may be converted in the second furnace, whereby practically the whole of the metal to be recovered from the ore or residue may be converted into chlorid to remain therein in that condition for subsequent recovery of the metal.

In testimony whereof I have hereunto signed my name to this specification in the presence of two subscribing witnesses.

EDGAR ROUSE SUTCLIFFE.

Witnesses:
  LIONEL ERNEST BUSSEY,
  ROBERT OWEN HUGHES.